June 30, 1959 L. A. MAJNERI 2,892,614
BLEEDER VALVE STRUCTURE
Filed March 21, 1955
FIG.1.
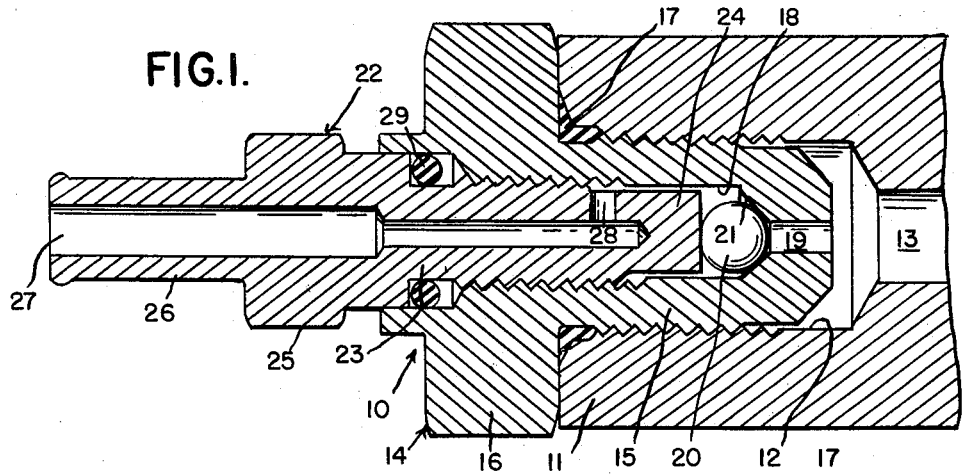
FIG.2.
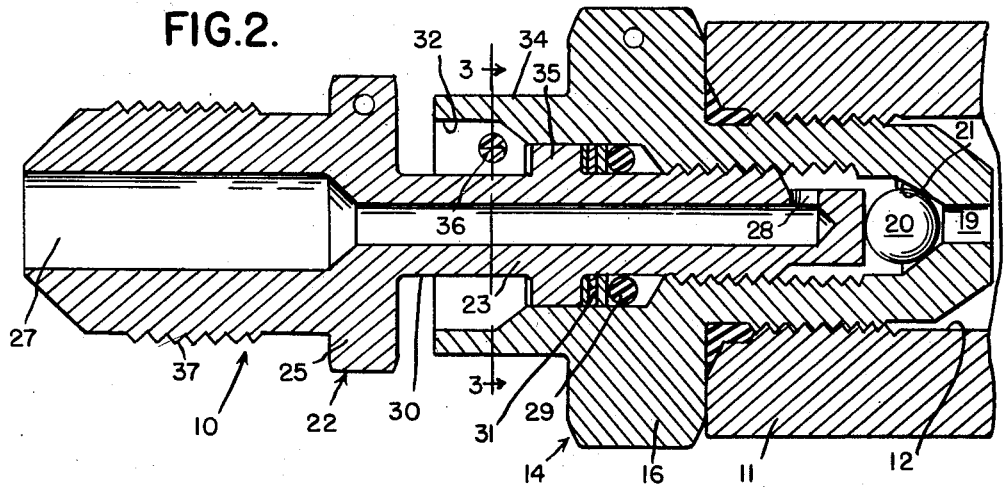
FIG.3.
FIG.4.
INVENTOR.
LUDWIG A. MAJNERI
BY Whittemore, Hulbert &
Belknap ATTORNEYS

United States Patent Office 2,892,614
Patented June 30, 1959

2,892,614

BLEEDER VALVE STRUCTURE

Ludwig A. Majneri, Grosse Pointe, Mich.

Application March 21, 1955, Serial No. 495,691

3 Claims. (Cl. 251—347)

This invention relates generally to valve assemblies and refers more particularly to an improved bleeder valve structure. The present application is a continuation-in-part of my prior co-pending application, Serial No. 438,-140, filed June 21, 1954.

It is an object of this invention to provide a bleeder valve assembly composed of a relatively few simple parts capable of being readily operated to either close or open a fluid passage and having provision for effectively sealing the parts in the open position of the valve to prevent leakage.

It is another object of this invention to provide a bleeder valve assembly which will also act as a check valve to trap relatively high pressures in a fluid line at the discharge side of the bleeder valve assembly. In accordance with this invention, the valve element moves freely in the released position of the bleeder valve and, hence, is movable into engagement with its seat to maintain pressures at the delivery side of the valve assembly which are greater than the pressures at the intake side. This arrangement is advantageous in instances where it is desired to indicate peak pressures existing in the system, since it renders it possible to trap fluid under pressure in a gauge connected to the delivery side of the bleeder valve so that the gauge will hold maximum pressure readings.

It is a further object of this invention to provide a bleeder valve assembly wherein the valve element may be removed and wherein the delivery side of the valve may be connected to a pressure gauge for indicating instantaneous pressures existing in the line to which the bleeder valve is connected.

Yet another object is to provide a bleeder valve assembly of the foregoing character which has improved provision to prevent possible destructive and dangerous separation of its parts upon manipulation to open the fluid passage through the assembly.

The foregoing as well as other objects will be made more apparent as this description proceeds especially when considered in connection with the accompanying drawing, wherein:

Fig. 1 is a fragmentary longitudinal sectional view through a valve assembly embodying the features of this invention and showing the same attached to a suitable fitting;

Fig. 2 is a fragmentary longitudinal sectional view of a modified form of construction;

Fig. 3 is a view in transverse section along line 3—3 of Fig. 2; and

Fig. 4 is a sectional view similar to Fig. 3 illustrating a further modification.

Referring to the embodiment of the invention shown in Fig. 1, the reference numeral 10 designates a valve assembly adapted to be mounted on a boss or like threaded fitting 11 of a system to which the bleeder valve assembly is applied. Boss 11 has an axially extending bore 12 open at its outer end and reduced at its inner end to form a fluid passage 13. A fitting 14 of the assembly has a reduced part 15 extending into the bore 12 which reduced part is externally threaded to engage corresponding internal threads formed on the inner surface of bore 12. The fitting 14 also has an enlarged hexagonal part 16 at the outer end of the reduced part 15, which part 16 abuts the outer end of the boss 11. A resilient sealing ring 17 is provided on reduced part 15 adjacent the inner side of the enlargement 16 to engage the outer end of the boss 11 and provide a fluid tight seal. The fitting 14 is formed with a bore 18 which extends inwardly from the outer end of the fitting and is reduced at its inner end to provide a passage 19 aligned with the passage 13 in the boss 11.

A valve element 20 in the form of a ball is located within the bore 18 in a position to engage an annular conical valve seat 21 which surrounds the outer end of the passage 19. The valve element or ball 20 is clamped against the seat 21 to maintain the passage 19 closed by a plug 22 having a reduced part 23 which extends into the bore 18. The reduced part is externally threaded to engage corresponding threads formed on the inner surface of the bore 18, and the inner end 24 of the part 23 is further reduced at 24 to provide a clearance around the same within bore 18.

The plug 22 has a hex enlargement 25 positioned at the outer side of the fitting enlargement 16 and has an extension 26 projecting outwardly from the enlargement 25 for connection with either a drain conduit or a pressure meter. It will also be noted from Fig. 1 of the drawing that the plug 22 has a passage 27 which extends axially from the outer end of the extension 26 to a point adjacent to, but short of the inner end of the plug. The inner end of the passage 27 communicates with the interior of the bore 18 through a port 28 formed in the reduced end portion 24 of the plug 22.

The arrangement is such that when the plug 22 is turned in a direction to loosen the threaded connection between the plug and fitting 14 the ball element 20 is released from the seat 21 to enable fluid under pressure to flow from the passage 13 to the pasage 27. On the other hand, tightening of the plug 22 in the fitting 14 engages the inner end of the plug with the ball 20 and forces the latter against the seat 21 to close communication between the passage 13 and the passage 27. When the valve plug 22 is in its released position, fluid under pressure is prevented from leaking past the plug by an O-ring seal 29 which surrounds the reduced portion 23 of the plug and engages the adjacent annular surface of the fitting 14.

It is apparent from the foregoing that the valve shown in Fig. 1 may be employed to either bleed the passage 13 of fluid under pressure or to actuate a pressure guage (not shown) which may be attached by a hose or conduit to the reduced end extension 26 of the plug. A drain hose or conduit (not shown) may also be attached to this reduced extension when it is desired to bleed the passage 13.

When a pressure gauge is attached to the reduced extension 26, the valve element 20 may either be left in place or may be removed entirely, depending on the result desired. In the event it is desired to hold maximum pressure readings on the gauge, the valve element 20 is left in place so that it will act as a check valve to trap the relatively high pressure in the gauge, on the other hand, if it is desired to indicate instantaneous pressures existing in the line connected to the passage 13 the valve element 20 is removed from the assembly.

It will be noted that the seal 17 insures against leakage of fluid under pressure from the assembly when the valve is in its open position.

A possibility exists that in manipulating the plug 22 of the embodiment of Fig. 1 to open the assembly for bleeding or pressure gauging, the plug will be rotated excessively. It may even be backed-off to such an extent that its threaded engagement in bore 18 of fitting 14 will fail to sustain the fluid pressure in passage 13. In this event the plug threads will be stripped and the assembly will be damaged, with the likelihood of dangerous results difficult to check under such circumstances. Accordingly, provision is made in the modified form of Figs. 2 and 3 to eliminate this possibility shown in Fig. 1. In regard to its basic functions and its general structural features, the assembly of Figs. 2 and 3 closely resembles that of Fig. 1, hence corresponding reference numerals are employed to designate parts and relationships corresponding to parts and relationships in Fig. 1, and further description thereof will be dispensed with.

As illustrated in Fig. 2, the plug 22 is machined at 30, outwardly of a shoulder surface 31 thereof which confines the O-ring 29 and associated sealing rings, to provide, in effect, a counterbored recess 32 between the thus machined stud portion and an outer, sleeve-like extremity 34 of fitting 14. A radial flange 35 is thus left on plug 22 immediately to the right of this space, and this flange member serves as one element of a stop device to limit excessive outward movement of the plug, i.e. to the left as viewed in Fig. 2. Flange 35 does this by engaging a cotter pin 36 or equivalent transverse stop element extending transversely of sleeve portion 34 and through space 32, in the fashion illustrated in Fig. 3. The cotter pin is locked in place as a bar to undesired outward movement of plug 22, being positioned just sufficiently outwardly of the flange to permit desired loosening movement of the plug for bleeding. However, plug flange 35 is engaged by stop pin 36 before the plug can be backed-off sufficiently to cause undue shear stress on its threads.

As distinguished from the embodiment of Fig. 1, the outer extremity of plug 22 is externally threaded at 37 for coupling with a drain pipe or gauge. However, the arrangements in this respect, as depicted in Figs. 1 and 2, are equivalents.

A further modified adaptation of the arrangement of Figs. 2 and 3 is shown in Fig. 4. Here the stop member which extends transversely of the fitting sleeve 34 is in the form of a U-shaped wire staple member 38, the legs of which are inserted in pairs of aligned openings 39 through the walls of the sleeve portion. The ends of the legs of member 38 are crimped at 40 after insertion to hold the member 38 against accidental displacement. This U-shaped form of stop will make the assembly more compact and should be used in the event the head of a cotter pin, such as is employed in Figs. 2 and 3, will project radially outwardly beyond the enlargement 16 of fitting 14.

What I claim as my invention is:

1. A bleeder valve assembly comprising a hollow body adapted to be connected to a fluid pressure passage and having a valve port communicable with said passage when the assembly is so connected, said body having an internal valve seat surrounding said port, a valve element freely movable in said body to engage and disengage said seat and thus close and open said port, a manually actuable control member threadedly engaged with said body, an annular seal between said body and control member outwardly of their zone of threaded engagement, said control member being movable to releasably engage said valve element and hold the same in closing relation to said port, said control member having a bleeder passage opening to the interior of said body inwardly of said zone of threaded engagement and communicating said port with the exterior of said assembly when said valve element opens said port, said control member having a radially outwardly projecting part axially confining said seal outwardly of said zone, and stop means on said body engageable with said radially extending part outwardly of the latter to limit the extent of movement of the control member in a direction to release said valve element, said stop means and radially extending part being relatively positioned to halt said last named movement while said body and control member still have threaded engagement over a substantial axial length sufficient to prevent stripping of threads under end pressure on said control member.

2. A bleeder valve assembly comprising a hollow body adapted to be connected to a fluid pressure passage and having a valve port communicable with said passage when the assembly is so connected, said body having an internal valve seat surrounding said port, a valve element freely movable in said body to engage and disengage said seat and thus close and open said port, a manually actuable control member threadedly engaged with said body, an annular seal between said body and control member outwardly of their zone of threaded engagement, said control member being movable to releasably engage said valve element and hold the same in closing relation to said port, said control member having a bleeder passage opening to the interior of said body inwardly of said zone of threaded engagement and communicating said port with the exterior of said assembly when said valve element opens said port, said control member having a radially outwardly projecting part axially confining said seal outwardly of said zone, and stop means on said body engageable with said radially extending part outwardly of the latter to limit the extent of movement of the control member in a direction to release said valve element, said stop means anr radially extending part being relatively positioned to halt said last named movement while said body and control member still have threaded engagement over a substantial axial length sufficient to prevent stripping of threads under end pressure on said control member, said stop means comprising a pin removably engaging and extending into said body, said radially extending part comprising a flange on said control member engageable with said pin upon movement of the control member in said alst named direction.

3. A bleeder valve assembly comprising a hollow body adapted to be connected to a fluid pressure passage and having a valve port communicable with said passage when the assembly is so connected, said body having an internal valve seat surrounding said port, a valve element freely movable in said body to engage and disengage said seat and thus close and open said port, a manually actuable control member threadedly engaged with said body, an annular seal between said body and control member outwardly of their zone of threaded engagement, said control member being movable to releasably engage said valve element and hold the same in closing relation to said port, said control member having a bleeder passage opening to the interior of said body inwardly of said zone of threaded engagement and communicating said port with the exterior of said assembly when said valve element opens said port, said control member having a radially outwardly projecting part axially confining said seal outwardly of said zone, and stop means on said body engageable with said radially extending part outwardly of the latter to limit the extent of movement of the control member in a direction to release said valve element, said stop means and radially extending part being relatively positioned to halt said last named movement while said body and control member still have threaded engagement over a substantial axial length sufficient to prevent stripping of threads under end pressure on said control member, said stop means comprising a pin member of U-shaped outline removably engaging and extending into said body in a straddling relation to said control member, said radially extending part comprising a flange on said control member engageable with said pin member upon movement of the control member in said last named direction.

References Cited in the file of this patent

UNITED STATES PATENTS

| | | | |
|---|---|---|---|
| 1,210,707 | Schweinert | Jan. 2, | 1917 |
| 1,263,599 | Poole | Apr. 23, | 1918 |
| 1,275,783 | Steinmetz | Aug. 13, | 1918 |
| 1,508,944 | Simon | Sept. 16, | 1924 |
| 1,541,251 | Bernard | June 9, | 1925 |
| 1,652,929 | | | |
| 1,693,975 | | | |
| 2,125,554 | | | |
| 2,370,182 | | | |
| 2,612,337 | Cadwood | Dec. 13, | 1927 |
| | Cordley | Dec. 4, | 1928 |
| | Franck | Aug. 2, | 1938 |
| | Morrow | Feb. 27, | 1945 |
| | Maynard | Sept. 30, | 1952 |

FOREIGN PATENTS

| | | | |
|---|---|---|---|
| 521,202 | France | of | 1921 |
| 538,380 | France | of | 1922 |
| 622,336 | France | of | 1927 |
| 301,931 | Italy | of | 1932 |